(12) United States Patent
Wang et al.

(10) Patent No.: US 7,874,156 B2
(45) Date of Patent: Jan. 25, 2011

(54) METHODS AND APPARATUS FOR HEATING A FLUID

(75) Inventors: Yu Wang, Mason, OH (US); George Hanna Ghanime, Ballston Spa, NY (US); Chi Tang, Mason, OH (US); Guy Wayne DeLeonardo, Glenville, NY (US)

(73) Assignee: General Electric Company, Schenectady, NY (US)

( * ) Notice: Subject to any disclaimer, the term of this patent is extended or adjusted under 35 U.S.C. 154(b) by 935 days.

(21) Appl. No.: 11/693,488

(22) Filed: Mar. 29, 2007

(65) Prior Publication Data

US 2008/0236800 A1    Oct. 2, 2008

(51) Int. Cl.
    *F02C 7/08* (2006.01)
(52) U.S. Cl. .................. 60/736; 60/39.511; 60/267
(58) Field of Classification Search .............. 60/39.511, 60/736, 266, 267, 730; 165/80.5, 154, 164, 165/170
    See application file for complete search history.

(56) References Cited

U.S. PATENT DOCUMENTS

| | | | | | |
|---|---|---|---|---|---|
| 2,362,271 | A | * | 11/1944 | Heymann | 165/135 |
| 2,462,421 | A | * | 2/1949 | Pitt | 165/81 |
| 2,663,549 | A | * | 12/1953 | Otten | 165/163 |
| 2,875,986 | A | * | 3/1959 | Holm | 165/145 |
| 3,222,864 | A | * | 12/1965 | Dyste et al. | 60/39.511 |
| 3,267,673 | A | * | 8/1966 | Hemsworth et al. | 60/39.511 |
| 3,320,749 | A | * | 5/1967 | Castle et al. | 60/226.1 |
| 3,507,115 | A | * | 4/1970 | Wisoka | 60/39.511 |
| 4,134,195 | A | * | 1/1979 | Jacobsen et al. | 29/890.038 |
| 4,180,973 | A | * | 1/1980 | Forster et al. | 60/39.511 |
| 4,483,307 | A | | 11/1984 | Gilmor | |
| 4,546,826 | A | * | 10/1985 | Zitzmann | 165/163 |
| 4,872,503 | A | * | 10/1989 | Marriner | 165/54 |
| 5,105,617 | A | * | 4/1992 | Malohn | 60/39.511 |
| 5,392,595 | A | * | 2/1995 | Glickstein et al. | 60/780 |
| 5,687,560 | A | * | 11/1997 | Janes | 60/39.58 |
| 5,845,481 | A | * | 12/1998 | Briesch et al. | 60/776 |
| 5,865,030 | A | * | 2/1999 | Matsuhama | 60/736 |
| 6,364,007 | B1 | * | 4/2002 | Fischer | 165/166 |
| 6,598,400 | B2 | * | 7/2003 | Nash et al. | 60/772 |

(Continued)

OTHER PUBLICATIONS

"Mueller Temp-Plate Heat Exchangers", http://www.specialized-mechanical.com/products/mueller_temp-plate.html; Copyright © 2001, SME Associates, LLC, Feb. 8, 2007; 2 pages.

(Continued)

*Primary Examiner*—William H Rodríguez
(74) *Attorney, Agent, or Firm*—Armstrong Teasdale LLP

(57) ABSTRACT

A method for heating a fluid in a turbine engine is provided. The method includes channeling an exhaust flow through an exhaust duct of the turbine engine and coupling a panel to the exhaust duct. The panel includes a first wall and an opposite second wall that is spaced a distance from the first wall such that at least one passageway is defined within the panel. The fluid is supplied to the at least one passageway through an inlet defined at a first end of the passageway, such that heat is transferred from the exhaust flow to the fluid flowing through the panel. The fluid is injected into the turbine engine.

20 Claims, 7 Drawing Sheets

U.S. PATENT DOCUMENTS

| | | |
|---|---|---|
| 6,820,422 B1 | 11/2004 | Linney et al. |
| 6,820,423 B1 | 11/2004 | Linney et al. |
| 6,832,470 B2 * | 12/2004 | Dewis ................. 60/39.511 |
| 6,907,920 B2 | 6/2005 | Warburton et al. |
| 6,962,054 B1 | 11/2005 | Linney et al. |
| 7,124,587 B1 | 10/2006 | Linney et al. |
| 7,213,391 B2 * | 5/2007 | Jones ..................... 60/226.1 |
| 7,487,642 B2 * | 2/2009 | Joshi et al. ................ 60/775 |
| 7,490,580 B2 * | 2/2009 | Hanai et al. ............. 122/31.1 |
| 2005/0047932 A1 | 3/2005 | Nakae et al. |
| 2007/0246191 A1 * | 10/2007 | Behrens et al. .......... 165/80.4 |
| 2008/0173006 A1 * | 7/2008 | Kataoka et al. ......... 60/39.511 |
| 2008/0202736 A1 * | 8/2008 | Specht ..................... 165/170 |
| 2010/0024429 A1 * | 2/2010 | Zhang et al. ................ 60/772 |
| 2010/0024430 A1 * | 2/2010 | Hofmann ................... 60/772 |
| 2010/0031624 A1 * | 2/2010 | Austin et al. ............... 60/39.5 |

OTHER PUBLICATIONS

"Mueller® Clamp-on Temp-Plate® Heat Transfer Surface", Mueller Heat Transfer Products Catalog, Installation Guidelines, TP-412-3; Copyright © 1998-2002 Paul Mueller Company; 1 page.

* cited by examiner

US 7,874,156 B2

METHODS AND APPARATUS FOR HEATING A FLUID

BACKGROUND OF THE INVENTION

This invention relates generally to turbine engines, and, more specifically, to methods and apparatus for heating a fluid for use in a turbine engine.

In some known gas turbine engines, heat energy from a primary thermal fluid, such as, but not limited to combustion gases and/or exhaust gases, is recovered and used in other engine functions. For example, recovered heat may be used to heat fuel to increase turbine efficiency. Heating a gaseous fuel before combustion removes liquids from the gaseous fuel, which in turn, increases a service life of the engine and increases power output of the turbine. When an oil fuel is used in a turbine, heating the oil fuel before combustion increases the ease of pumping by reducing the viscosity of the oil fuel and facilitates atomization of the oil fuel. Another example of a use for recovered heat is heating inlet air to increases turbine efficiency. Preheating air entering a combustor decreases the amount of fuel needed in the combustor. Additionally, recovered heat systems may be used to prevent ice from forming on the engine.

Some known turbines recover heat by using either a regenerator or a heat exchanger that is built into a Heat Recovery Steam Generator (HRSG). In some known gas turbines, a regenerator is positioned between a compressor and a combustor to heat air entering the combustor. More specifically, to heat the inlet air, turbine exhaust gases flow through the regenerator in an opposite direction to the direction of the flow of the combustor inlet air to heat the inlet air. Other known turbines use an additional heat exchanger in a HRSG to preheat fuel using recovered steam. However, the addition of a regenerator or a heat exchanger may add cost and/or complications to an already complex power generation system. Moreover, the regenerator and/or heat exchanger may occupy a large physical space within a power plant, and/or either component may also require being coupled to a water supply system within the plant.

BRIEF DESCRIPTION OF THE INVENTION

In one aspect a method for heating a fluid in a turbine engine is provided. The method includes channeling an exhaust flow through an exhaust duct of the turbine engine and coupling a panel to the exhaust duct. The panel includes a first wall and an opposite second wall that is spaced a distance from the first wall such that at least one passageway is defined within the panel. The fluid is supplied to the at least one passageway through an inlet defined at a first end of the passageway, such that heat is transferred from the exhaust flow to the fluid flowing through the panel. The fluid is injected into the turbine engine.

In another aspect a heat exchanger for a turbine engine is provided. The heat exchanger includes at least one panel having a first wall, an opposite second wall, and at least one passageway extending therebetween. The at least one panel is configured to transfer heat from a turbine exhaust flow to a fluid flowing through the at least one panel. At least one inlet is coupled in flow communication with the at least one passageway. The at least one inlet is configured to channel fluid into the at least one passageway. At least one outlet is defined in the at least one panel. The at least one outlet is coupled in flow communication to the at least one passageway for discharging fluid from the at least one panel to the turbine engine.

In a still further aspect a fuel supply assembly for a turbine engine is provided. The assembly includes a fuel supply line having a heat exchange section and an exhaust duct having an exhaust flow therein. The heat exchange section includes a panel having a first wall, an opposite second wall, and at least one passageway extending therebetween. The panel is configured to transfer heat from the exhaust flow to a fuel flowing through the panel. The heat exchange section further includes at least one inlet coupled in flow communication with the passageway. The inlet is configured to channel fuel into the passageway. The heat exchange section further includes at least one outlet defined in the panel. The outlet is coupled in flow communication to the passageway for discharging fuel from the panel to a combustor.

DETAILED DESCRIPTION OF THE INVENTION

Figure 1:
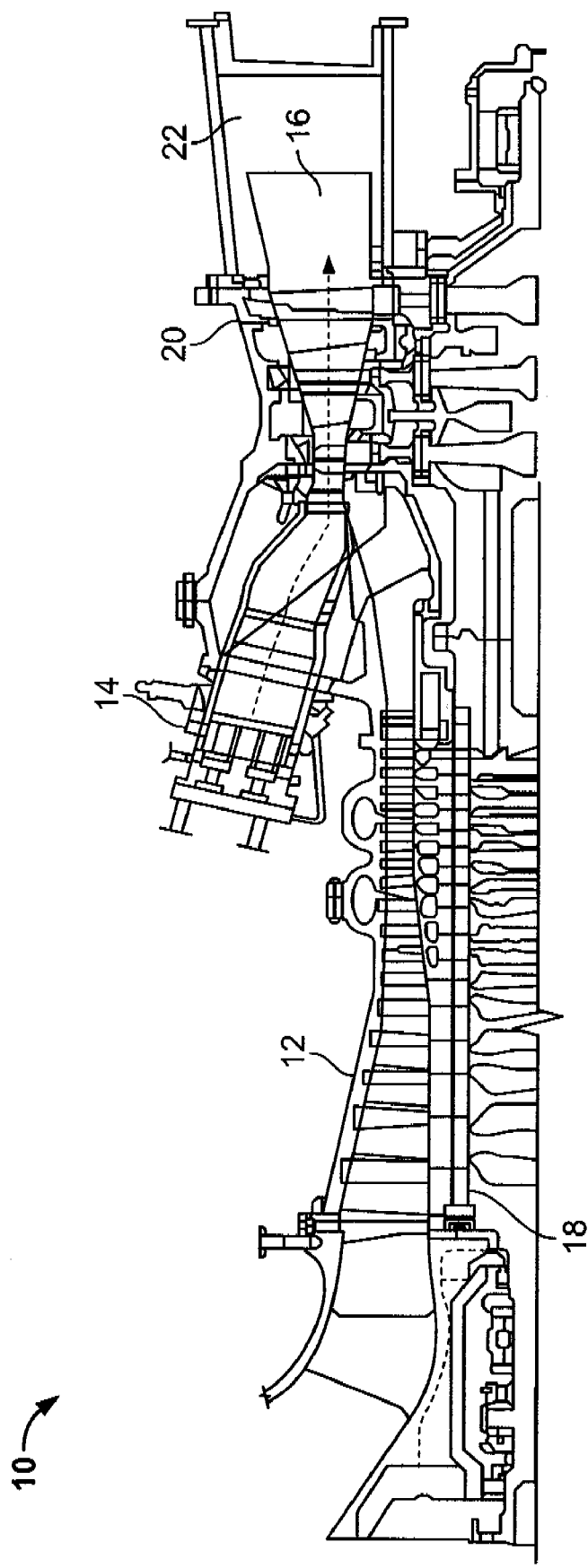
FIG. 1 is a schematic cross-sectional illustration of an exemplary gas turbine engine.

FIG. 1 is a schematic cross-sectional illustration of an exemplary gas turbine engine 10. Engine 10 includes a compressor assembly 12, a combustor assembly 14, a turbine assembly 16, and a common compressor/turbine rotor shaft 18. It should be noted that engine 10 is exemplary only, and that embodiments of the present invention are not limited to engine 10 and may instead be implemented within any gas turbine engine or heated system that uses a fluid that may be pre-heated in a similar manner described herein.

In operation, air flows through compressor assembly 12 and compressed air is discharged to combustor assembly 14 for mixing with fuel and cooling parts of combustor assembly 14. Combustor assembly 14 injects fuel, for example, natural gas and/or fuel oil, into the air flow, ignites the fuel-air mixture to expand the fuel-air mixture through combustion and generates a high temperature combustion gas stream 16. Combustor assembly 14 is in flow communication with a turbine assembly 20, and discharges the high temperature expanded gas stream 16 into turbine assembly 20. The high temperature expanded gas stream 16 imparts rotational energy to turbine assembly 20, and, because, turbine assembly 20 is rotatably coupled to rotor 18, rotor 18 subsequently provides rotational power to compressor assembly 12. Gas stream 16 is discharged from turbine assembly 20 into an exhaust duct 22.

Figure 2:
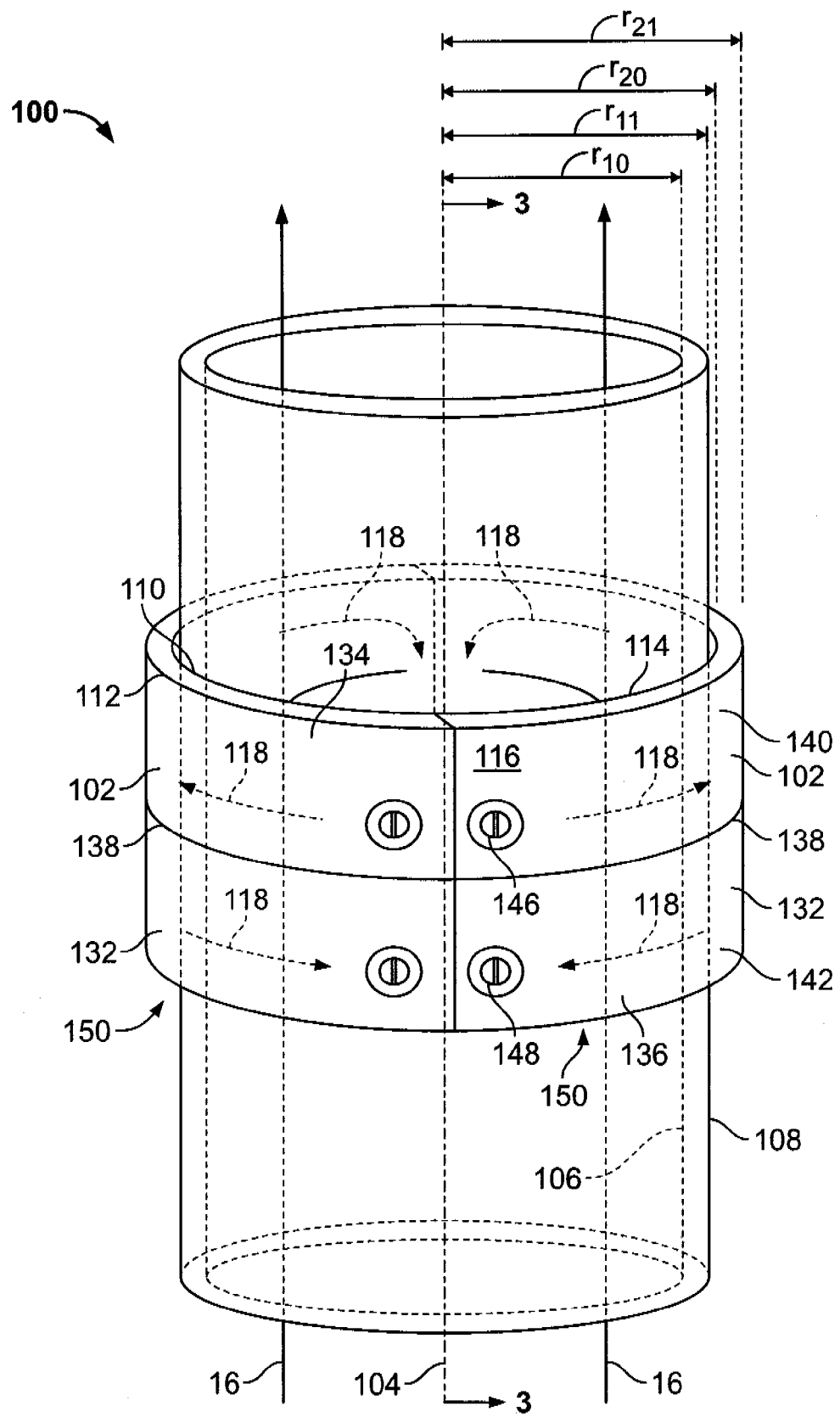
FIG. 2 is a schematic illustration of an exemplary exhaust stack and an exemplary heat exchange panel that may be used with the gas turbine engine shown in FIG. 1.
Figure 3:
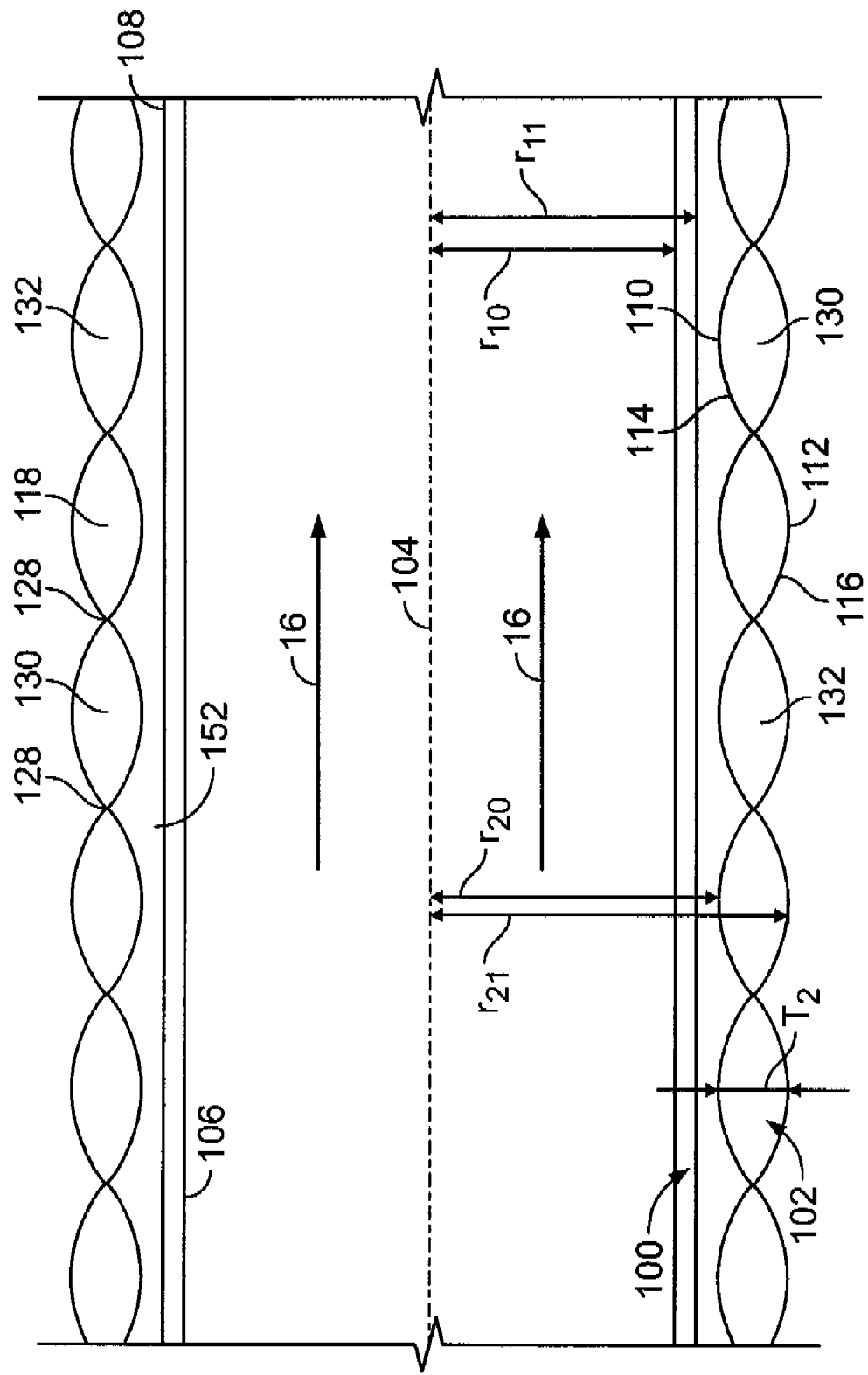
FIG. 3 is a cross sectional view of the exhaust stack and the heat exchange panel shown in FIG. 2 and taken along line 3-3.
Figure 4:
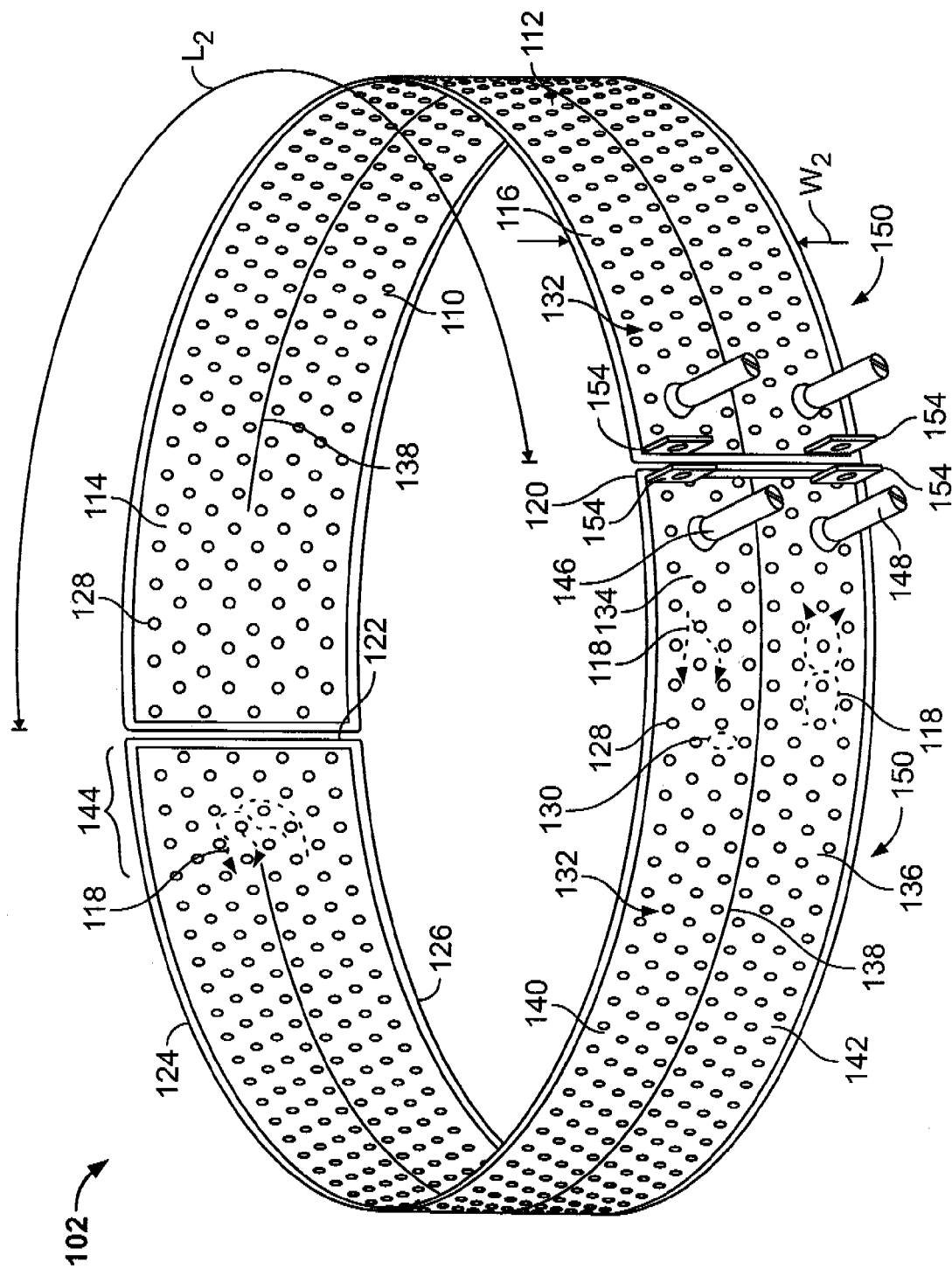
FIG. 4 is a perspective view of the heat exchange panel shown in FIG. 2.

FIG. 2 is a schematic of an exemplary exhaust stack 100 that may be used with engine 10, for example. FIG. 3 is a cross sectional illustration of exhaust stack 100 and a heat exchange panel 102 taken along line 3-3. FIG. 4 is a perspective view of heat exchange panel 102. In the exemplary embodiment, exhaust duct 22 is coupled in flow communication with exhaust stack 100 such that gas stream 16 discharged from exhaust duct 22 enters exhaust stack 100. Exhaust stack 100 may be an existing exhaust stack 100 or a newly installed exhaust stack 100. Gas stream 16 flows through stack 100 generally parallel to a centerline 104 extending through stack 100. In the exemplary embodiment, stack 100 has a length $L_1$, an inner radius $r_{10}$, and an outer radius $r_{11}$. Inner radius $r_{10}$ is defined by a stack radially inner surface 106, and outer radius $r_{11}$ is defined by a stack radially outer surface 108. In the exemplary embodiment, length $L_1$, inner radius $r_{10}$, and outer radius $r_{11}$ are selected to facilitate gas stream 16 being cooled before stream 16 is discharged to the environment. Stack 100 may be fabricated from a variety of materials, such as, but not limited to, steel or any other conductive metal.

In the exemplary embodiment, each heat exchange panel 102 is formed with an inner wall 110 and an outer wall 112, as described in more detail below. Furthermore, in the exemplary embodiment, each panel 102 has a length $L_2$, and a width $W_2$, and is formed arcuately with an inner radius $r_{20}$, and an outer radius $r_{21}$. Inner radius $r_{20}$ is defined by a panel inner surface 114 and outer radius $r_{21}$ is defined by a panel outer surface 116. More specifically, in the exemplary embodiment, panel inner surface 114 is defined by inner wall 110, and panel outer surface 116 is defined by outer wall 112. Each panel 102 has a thickness $T_2$ that is measured from inner surface 114 to outer surface 116 such that a fuel 118, such as, but not limited to, natural gas or petroleum-based oil, may be channeled through panel 102. In the exemplary embodiment, radius $r_{20}$ and length $L_2$ are variably selected based on the dimensions of stack 100.

In the exemplary embodiment, heat exchange panel 102 is arcuate such that inner wall 110 is formed with inner radius $r_{20}$ and outer wall 112 is formed with outer radius $r_{21}$. More specifically, in the exemplary embodiment, inner wall 110 and outer wall 112 are each fabricated from metallic materials, such as, but not limited to, steel or any other conductive metal material. Inner wall 110 is welded to outer wall 112 along edges 120, 122, 124, and 126 wherein edges 120 and 122 are lateral edges, and edges 124 and 126 are circumferential edges. A plurality of dimples or depressions 128 are formed in inner wall 110 and/or outer wall 112. More specifically, in the exemplary embodiment, inner wall 110 contacts outer wall 112 at each dimple 128. As such, in the exemplary embodiment, a plurality of chambers 130 is defined between inner wall 110 and outer wall 112. Alternatively, inner wall 110 does not contact outer wall 112 at each dimple 128. Air (not shown) may be channeled between inner wall 110 and outer wall 112 to enable panel 102 to be pneumatically inflated to a desired thickness $T_2$.

In the exemplary embodiment, a passageway 132 is defined between inner wall 110 and outer wall 112. As such, in portions, passageway 132 has a width $T_2$. In a first embodiment, passageway 132 is oriented such that a first end 134 and a second end 136 of passageway 132 are positioned adjacent the same panel lateral edge 120 or 122. In another embodiment, passageway 132 is oriented such that first end 134 and second end 136 are positioned adjacent opposite panel edges 120 and 122. More specifically, in the exemplary embodiment, as shown in FIG. 4, panel 102 includes an integral divider 138 formed therein that separates passageway 132 into two opposing paths 140 and 142. As such, in the exemplary embodiment, panel 102 includes one divider 138 such that passageway 132 includes one turn 144. Alternatively, panel 102 may include a plurality of dividers 138 that form a plurality of turns 144 and/or a plurality of passageways 132.

In the exemplary embodiment, first passageway end 134 includes an inlet 146 and second passageway end 136 includes an outlet 148. In the exemplary embodiment, fuel 118 flows from a fuel source (not shown) through inlet 146 and into passageway 132. Fuel 118 flows through passageway 132 and is discharged through outlet 148. In the exemplary embodiment, fuel 118 exiting outlet 148 is injected into combustor 14. Alternatively, inlet 146 may channel fuel 118 into more than one passageway 132, and/or fuel 118 from more than one passageway 132 may be discharged through outlet 148. In another embodiment, passageway 132 may include more than one inlet 146 and/or more than one outlet 148.

In the exemplary embodiment, a plurality of panels 102 are coupled substantially circumferentially around stack 100. More specifically, as illustrated in FIG. 2, a pair 150 of panels 102 are positioned end-to-end to extend substantially circumferentially about stack outer surface 108. Alternatively, panels 102 may be sized such that more or less than two panels 102 may be coupled substantially around stack outer surface 108. Although, in the exemplary embodiment, one pair 150 of panels 102 is shown coupled substantially circumferentially around stack 100, more than one pair 150 of panels 102 may be coupled to stack 100. As such, adjacent panel pairs 150 may be axially coupled together. In an alternate embodiment, at least one panel 102 is coupled to a turbine component other than exhaust stack 100, such as, but not limited to, exhaust duct 22 and/or any other duct through which a heated fluid flows. In the exemplary embodiment, a heat transfer mastic 152 is applied to stack outer surface 108 and/or to panel inner surface 114 prior to panel 102 being coupled to stack 100. Heat transfer mastic 152 transfers heat from stack 100 to panel 102. Heat transfer mastic 152 is able to withstand high temperatures while securing panel 102 to stack 100.

To couple circumferentially-adjacent panels 102 together, in the exemplary embodiment, each panel lateral edge 120 and 122 includes two flanges 154. Alternatively, more or less than two flanges 154 may be used to couple circumferentially-adjacent panels 102 together. In the exemplary embodiment, spring loaded bolt fasteners (not shown) are inserted through flanges 154 to couple panels 102 together. Alternatively, any other suitable coupling means may be used to couple circumferentially-adjacent panels 102 together.

In the exemplary embodiment, stack 100 has a substantially a circular cross-sectional shape, and panel 102 is formed arcuately into a substantially circular profile. Alternatively, stack 100 and panel 102 may each have any cross-sectional suitable shape, such as, for example, but not limited to, a rectangular or elliptical cross-sectional shape. To facilitate heat transfer from stack 100 to fuel 118, panel 102 and stack 100 are fabricated with substantially similar cross-sectional shapes such that panel 102 substantially mates against stack 100.

During operation, each pair 150 of circumferentially-adjacent panels 102 is coupled to stack 100 end-to-end across stack outer surface 108. Stack 100 may be an existing stack 100 or a newly installed stack 100. Fuel 118 enters each inlet 146 and is channeled through each passageway 132. As fuel 118 flows through passageway 132, heat is facilitated to be transferred from gas stream 16 channeled through stack 100 to fuel 118 flowing through panel 102. As a result, a temperature of fuel 118 is increased. More specifically, gas stream 16 convectively heats stack 100, and heat panel 102 and fuel 118 therein are conductively heated by stack 100. Other types of heat transfer, such as, but not limited to, radiant heat transfer, may occur to facilitate heating fuel 118 flowing within panel 102. In the exemplary embodiment, fuel 118 exits panel 102 through outlets 148 and is injected into combustor 14. Alternatively, fluids other than fuel 118 may be heated in panel 102, for example, but not limited to, combustor inlet air (not shown).

Heating fuel 118 prior to being injected into combustor 14 facilitates increasing turbine efficiency because non-combustible liquids are facilitated to be removed from the gaseous fuel 118. As such, the useful life and power output of turbine 10 are facilitated to be increased. When an oil-based fuel 118 is used in turbine 10, heating oil fuel 118 before combustion facilitates reducing the viscosity of oil fuel 118 which facilitates the atomization of oil fuel 118. In another embodiment, heating inlet air (not shown) prior to combustion facilitates increasing turbine efficiency as the amount of fuel 118 needed in combustor 14 is decreased as the temperature of the air used for combustion is increased. Additionally, recovered heat systems, for example, heat exchange panels 102, may be used to facilitate preventing ice from forming on surface areas of engine 10.

In the exemplary embodiment, during operation, dimples 128 facilitate increasing a heat transfer to fuel 118 flowing through panel 102. Dimples 128 increase the internal surface area (not shown) of panel 102 in contact with flowing fuel 118. As such, heat transfer to fuel 118 is facilitated to be increased. Furthermore, dimples 128 create tortuous flow paths through panel 102. The tortuous flow paths facilitate decreasing the flow velocity of fuel 118 such that fuel 118 remains in panel 102 for a longer time period. As a result, heat transfer to fuel 118 is facilitated to be increased.

In the exemplary embodiment, panel 102 may be fabricated for use with any suitable existing structure, for example, stack 100, as described above. Furthermore, panel 102 may be fabricated and coupled to turbine 10, while turbine 10 remains in service. As such, the operational downtime of turbine 10 is facilitated to be decreased in comparison to turbines for which a new HRSG and/or an additional heat exchanger is constructed. Similarly, panels 102 facilitate decreasing the time spent modifying turbine 10 because panels 102 are coupled to existing structures using flanges 154 and any suitable fastener. Because panel 102 may be coupled to any suitable existing structure, panels 102 facilitate decreasing the cost and modification time in comparison to modifications involving constructing and installing known heat exchange devices, such as, a HRSG system.

Figure 5:
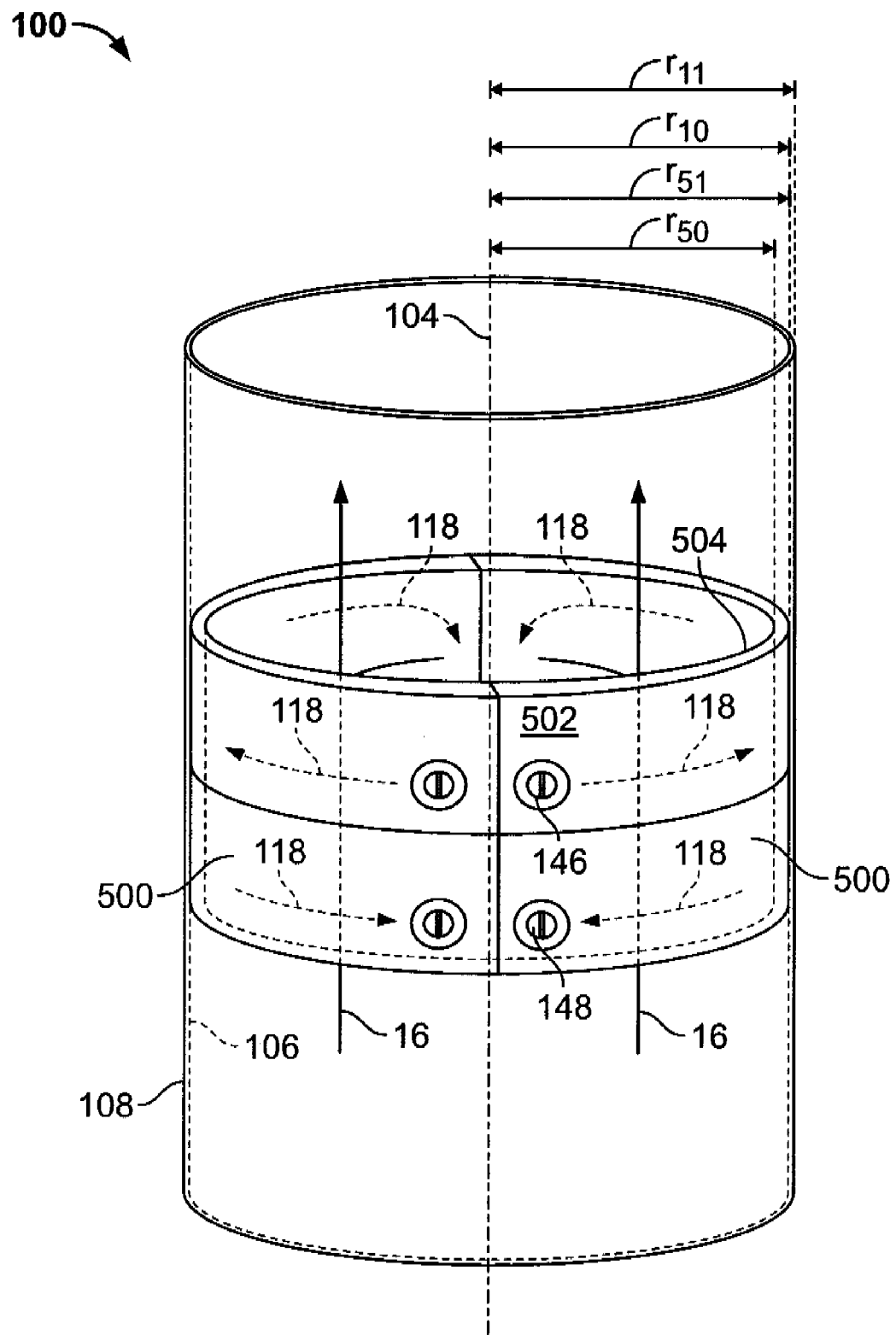
FIG. 5 is a schematic illustration of an alternative heat exchange panel that may be used with the gas turbine engine shown in FIG. 1.

FIG. 5 is a schematic illustration of an alternative heat exchange panel 500 that may be used with gas turbine engine 10. Heat exchange panel 500 is substantially similar to heat exchange panel 102, as described above, with the exception that heat exchange panel 500 is coupled to inner surface 106 of stack 100 rather than outer surface 108, as described above. More specifically, in the exemplary embodiment, panel 500 is formed with an inner radius $r_{50}$ and an outer radius $r_{51}$ that are selected to enable each panel 500, or a plurality of panels 500, to extend circumferentially against stack inner surface 106. Moreover, in the exemplary embodiment, a panel outer surface 502 contacts stack inner surface 106. Alternatively, heat transfer mastic 152 may be applied to stack inner surface 106 and/or to panel outer surface 502 to enable panel 500 to be coupled to stack 100. Gas stream 16 flows through stack 100 and a panel inner wall 504 to enable heat from gas stream 16 to be transferred through inner wall 504 to fuel 118 flowing through panel 500.

Figure 6:
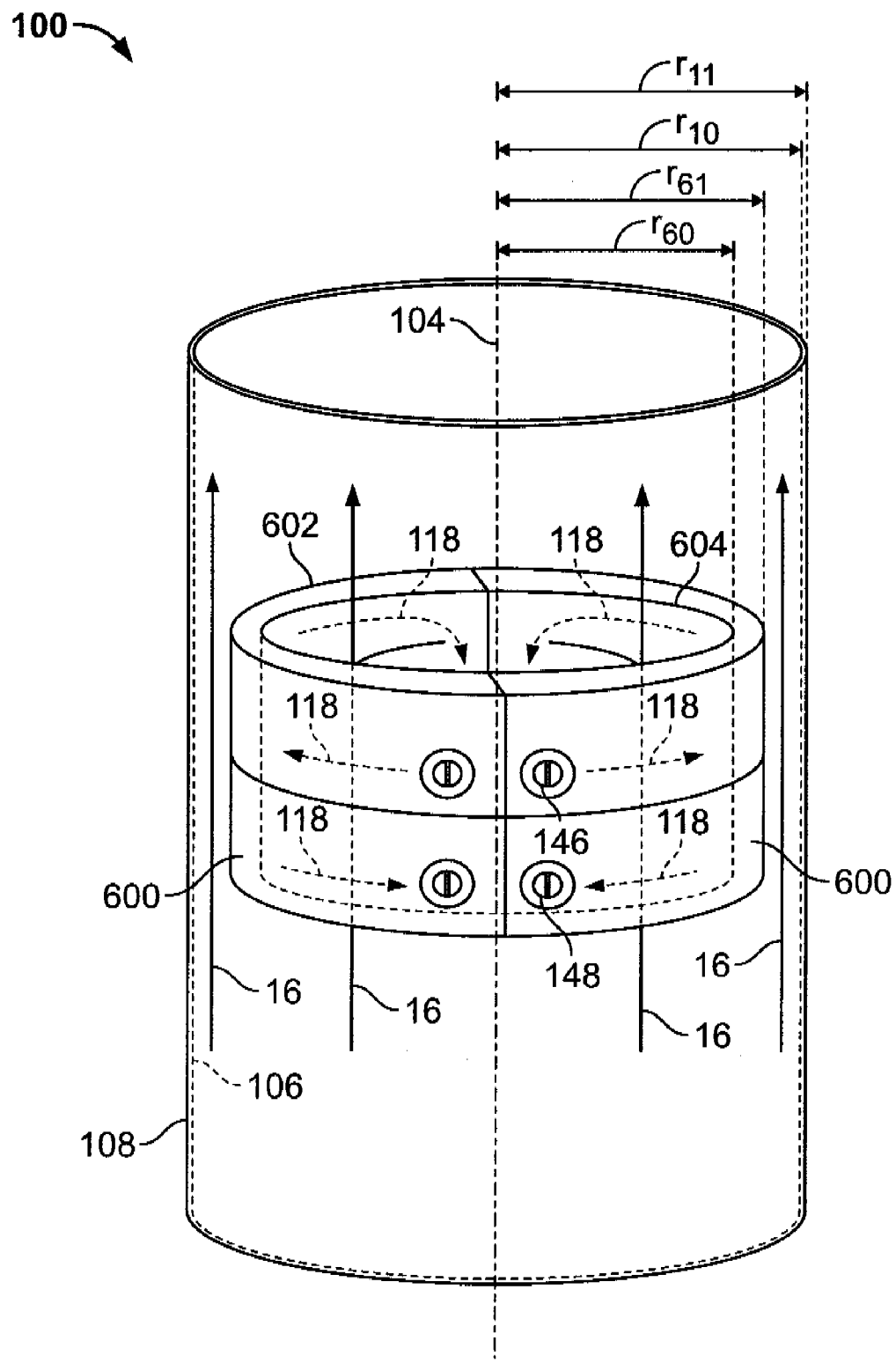
FIG. 6 is a schematic illustration of another alternative heat exchange panel that may be used with the gas turbine engine shown in FIG. 1.

FIG. 6 is a schematic illustration of another alternative heat exchange panel 600 that may be used with gas turbine engine 10. Heat exchange panel 600 is substantially similar to heat exchange panel 102, as described above, with the exception that heat exchange panel 600 is coupled adjacent stack inner surface 106 rather than against stack outer surface 108, as described above. More specifically, in the exemplary embodiment, each panel 600 is formed with an inner radius $r_{60}$ and an outer radius $r_{61}$ that are selected to enable panel 600 to be received within stack 100 without contacting stack inner surface 106. As such, gas stream 16 flows through stack 100 against an outer wall 602 and an inner wall 604 of panel 600 such that heat from gas stream 16 is transferred through panel inner wall 604 and outer wall 602 to fuel 118 flowing through panel 600.

Figure 7:
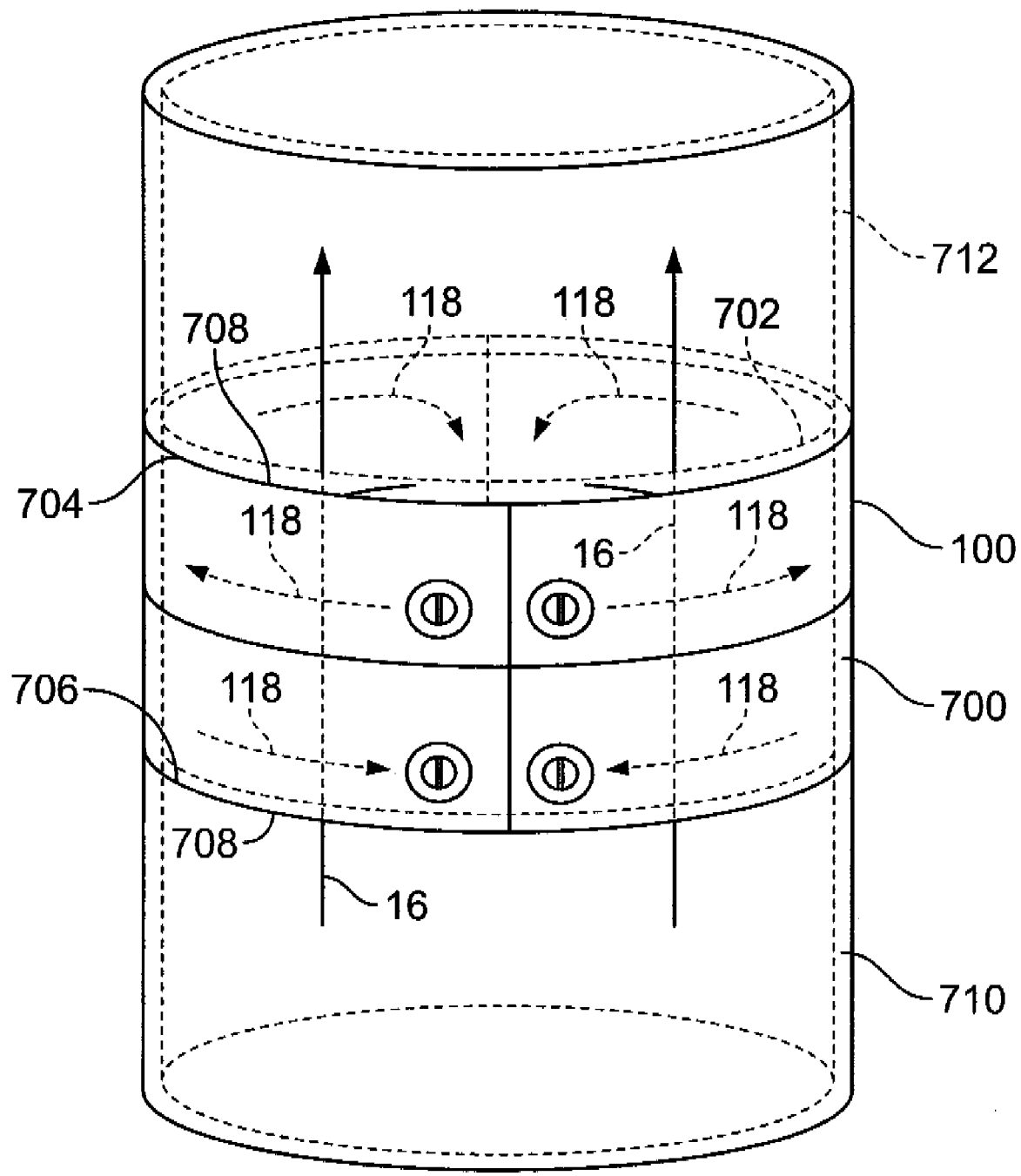
FIG. 7 is a schematic illustration of a still further alternative heat exchange panel that may be used with the gas turbine engine shown in FIG. 1.

FIG. 7 is a schematic illustration of a still further alternative heat exchange panel 700 that may be used with gas turbine engine 10. Heat exchange panel 700 is substantially similar to heat exchange panel 102, as described above, with the exception that a portion of stack 100 is removed and replaced with panel 700 rather than coupling panel 700 to stack outer surface 108, as described above. More specifically, panel 700 forms a portion of stack 100 such that a panel inner surface 702 contacts gas stream 16 to transfer heat from gas stream 16 to fuel 118 within panel 102. Panel circumferential edges 704 and/or 706 may be coupled to an axial edge 708 of a portion 710 and/or 712 of stack 100 using, for example, welding or any other suitable method that enables stack 100 and panel 700 to function as described herein.

The above-described methods and apparatus facilitate increasing an efficiency and power output of a turbine by transferring heat into a fuel injected into the combustor. The heat exchange panels facilitate modifying existing turbine components in a cost-effective and time-effective manner, as described herein. Because the heat exchange panels may be secured to an existing fluid flow duct or stack, the heat exchange panels are significantly less expensive than the costs and complications of constructing a new HRSG system. Moreover, the heat exchange panels to not require the amount of physical space required for a pre-heater modification to an existing system. As a result, turbines modified with the panel experience less downtime during the modification. Furthermore, because the panels facilitate heat transfer directly to the fuel flowing therein, a water supply system is not required to supply a heat transfer medium. In addition, the shape and orientations of the panels enable a plurality of existing turbine designs to be modified because the panel dimensions and shapes may be variably selected based on the turbine being modified.

Exemplary embodiments of methods and apparatus to heat a fluid for use in a turbine are described above in detail. The methods and apparatus are not limited to the specific embodiments described herein, but rather, components of the methods and apparatus may be utilized independently and separately from other components described herein. For example, the apparatus may also be used in combination with other turbine fluids to be heated, and is not limited to practice with only gas turbine engine fuel as described herein. Rather, the present invention can be implemented and utilized in connection with many other heat recovery applications.

While the invention has been described in terms of various specific embodiments, those skilled in the art will recognize that the invention can be practiced with modification within the spirit and scope of the claims.

What is claimed is:

1. A method for heating a fluid fuel in a turbine engine, said method comprising:
channeling an exhaust flow through an exhaust duct of the turbine engine;
coupling a panel to the exhaust duct, wherein the panel has an arcuate cross-sectional shape and includes a first wall and an opposite second wall that is spaced a distance from the first wall such that at least one passageway is defined within the panel;

supplying fuel to the at least one passageway through an inlet defined at a first end of the passageway, such that heat is transferred from the exhaust flow to the fuel flowing through the panel; and injecting fuel into the turbine engine.

2. A method in accordance with claim 1 wherein coupling a panel to the exhaust duct comprises coupling a panel to the exhaust duct, wherein the panel includes a plurality of passageways defined therein, each of the passageways including at least one inlet and at least one outlet.

3. A method in accordance with claim 1 wherein coupling a panel in flow communication to the exhaust flow comprises coupling a panel that includes a plurality of depressions defined in at least one of the first wall and the second wall.

4. A method in accordance with claim 1 wherein coupling a panel to the exhaust duct comprises further coupling the panel to an outer wall of the exhaust duct.

5. A method in accordance with claim 1 wherein coupling a panel to the exhaust duct comprises coupling the panels to the exhaust duct such that the exhaust flow is in fluid communication with at least one of the first panel wall and the second panel wall.

6. A method in accordance with claim 1 wherein coupling a panel to the exhaust duct comprises coupling the panel to the exhaust duct using a heat transfer mastic.

7. A method in accordance with claim 1 wherein coupling a panel to the exhaust duct comprises coupling a plurality of panels to the exhaust duct.

8. A heat exchanger for a turbine engine, said heat exchanger comprising:

at least one panel having an arcuate cross-sectional shape and comprising a first wall, an opposite second wall, and at least one passageway extending therebetween, said at least one panel configured to transfer heat from a turbine exhaust flow to fuel flowing through said at least one panel;

at least one inlet coupled in flow communication with said at least one passageway, said at least one inlet configured to channel fuel into said at least one passageway; and at least one outlet defined in said at least one panel, said at least one outlet coupled in flow communication to said at least one passageway for discharging fuel from said at least one panel to said turbine engine.

9. A heat exchanger in accordance with claim 8 wherein said at least one panel is coupled to an exhaust duct, wherein said exhaust duct comprises said exhaust flow therein.

10. A heat exchanger in accordance with claim 8 wherein at least one of said first wall and said second wall comprises a plurality of depressions defined therein.

11. A heat exchanger in accordance with claim 10 wherein said plurality of depressions form a plurality of chambers within said at least one passageway.

12. A heat exchanger in accordance with claim 8 wherein said at least one panel comprises a plurality of passageways defined therein, wherein each of said plurality of passageways comprises at least one inlet and at least one outlet.

13. A heat exchanger in accordance with claim 8 wherein said at least one inlet is defined in a passageway first end, and said at least one outlet is defined in a passageway second end.

14. A fuel supply assembly for a turbine engine, said assembly comprising:

a fuel supply line comprising a heat exchange section; and an exhaust duct comprising an exhaust flow therein;

said heat exchange section comprising:

a panel having an arcuate cross-sectional shape and comprising a first wall, an opposite second wall, and at least one passageway extending therebetween, said panel configured to transfer heat from said exhaust flow to a fuel flowing through said panel;

at least one inlet coupled in flow communication with said at least one passageway, said at least one inlet configured to channel fuel into said at least one passageway; and at least one outlet defined in said panel, said at least one outlet coupled in flow communication to said at least one passageway for discharging fuel from said panel to a combustor.

15. A fuel supply assembly in accordance with claim 14 wherein said panel is coupled to said exhaust duct such that panel contacts at least one of an outer duct surface, an inner duct surface, and said exhaust flow.

16. A fuel supply system in accordance with claim 14 wherein at least one of said first wall and said second wall comprises a plurality of depressions defined therein.

17. A fuel supply system in accordance with claim 16 wherein said plurality of depressions form a plurality of chambers within said at least one passageway.

18. A fuel supply system in accordance with claim 14 wherein said panel comprises a plurality of passageways defined therein, wherein each of said plurality of passageways comprises at least one inlet and at least one outlet.

19. A fuel supply system in accordance with claim 14 wherein said inlet is defined in a passageway first end, and said outlet is defined in a passageway second end.

20. A fuel supply system in accordance with claim 19 wherein said first passageway first end is defined at a first panel edge, and said second passageway end is defined at one of said first panel edge and a second panel edge.

* * * * *